(12) United States Patent  
McCarthy et al.

(10) Patent No.: US 8,719,861 B2  
(45) Date of Patent: May 6, 2014

(54) SYSTEM AND METHOD FOR DISTRIBUTING DYNAMIC EVENT DATA IN AN INTERNET PROTOCOL TELEVISION SYSTEM

(75) Inventors: Mary Catherine McCarthy, San Antonio, TX (US); Roland Noll, San Antonio, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 1605 days.

(21) Appl. No.: 11/541,959

(22) Filed: Oct. 2, 2006

(65) Prior Publication Data

US 2008/0092199 A1    Apr. 17, 2008

(51) Int. Cl.
*H04N 7/025* (2006.01)
*H04N 7/16* (2011.01)
*H04N 21/20* (2011.01)
*H04N 21/25* (2011.01)

(52) U.S. Cl.
CPC ............... *H04N 21/20* (2013.01); *H04N 21/25* (2013.01)
USPC .............................. 725/34; 725/141; 725/153

(58) Field of Classification Search
CPC ........................................................ H04N 21/20
USPC ......................................................... 725/34
See application file for complete search history.

(56) References Cited

U.S. PATENT DOCUMENTS

| | | | |
|---|---|---|---|
| 6,826,267 B2 | 11/2004 | Daum et al. | |
| 6,868,292 B2 | 3/2005 | Ficco et al. | |
| 2001/0052077 A1* | 12/2001 | Fung et al. | 713/184 |
| 2002/0046299 A1* | 4/2002 | Lefeber et al. | 709/318 |
| 2006/0123053 A1 | 6/2006 | Scannell, Jr. | |
| 2006/0168635 A1 | 7/2006 | Terashima et al. | |
| 2006/0184989 A1* | 8/2006 | Slothouber | 725/110 |

FOREIGN PATENT DOCUMENTS

WO      WO 02/23802 A2     3/2002

OTHER PUBLICATIONS http://www.upnp-ic.org/, News Release—UPnP Forum Releases Enhanced AV Specifications Taking Home Network to the Next Level, San Ramon, California, Jul. 12, 2006, pp. 1-2.
http://www.dlna.org/en/industry/about/dlna_white_paper 2006.pdf, DLNA Overview and Vision Whitepaper 2006, pp. 1-20.
http://www.galaxymetalgear.com/Products/3500IPTV.html, 3500 IPTV DMG—Digital Media Gateway, pp. 1-7.
http://www.pacemicro.com/americas/newsroom/pacenewsitems.asp?id=10452, Pace Micro and Universal Electronics Join Forces to Demonstrate Networked Home Technology, pp. 1-4.

(Continued)

*Primary Examiner* — Nathan Flynn
*Assistant Examiner* — James R Marandi
(74) *Attorney, Agent, or Firm* — G. Michael Roebuck

(57) ABSTRACT

A method for distributing dynamic event notification data in an internet protocol television (IPTV) system including receiving at an IPTV server the dynamic event notification data indicating an occurrence of a dynamic event; identifying at the IPTV server a current IPTV viewer associated with an IPTV end user client device; retrieving at the IPTV server an event filter for the current IPTV viewer; filtering at the IPTV server the dynamic event notification data through the event filter for the current IPTV viewer; and sending from the IPTV server to an end user client device associated with the current IPTV viewer, the dynamic event notification data when the dynamic event notification data passes through the event filter.

17 Claims, 5 Drawing Sheets

(56) References Cited

OTHER PUBLICATIONS http://www.s2data.com/dhdc05/agenda.htm, Conference Agenda, Sep. 28-29, 2005, Taipei, Taiwan, The Westin Taipei, pp. 1-6.

Joseph Chou and Timothy Simerly, http://www.videsignline.com/howt/innovativeapplications/170701703, How DLNA and UPnP will enable easy home video networks, Sep. 9, 2005, pp. 1-10.

* cited by examiner

SYSTEM AND METHOD FOR DISTRIBUTING DYNAMIC EVENT DATA IN AN INTERNET PROTOCOL TELEVISION SYSTEM

BACKGROUND

1. Field of Disclosure

The disclosure relates to the field of distributing data in an internet protocol television (IPTV) system.

2. Description of the Related Art

In the information age, television is only one of the sources of information on which viewers rely. With the evolution of the internet and mobile technology, emails, cell phones and mobile personal data assistants have now become essential components to staying in touch and informed.

DETAILED DESCRIPTION

Figure 1:
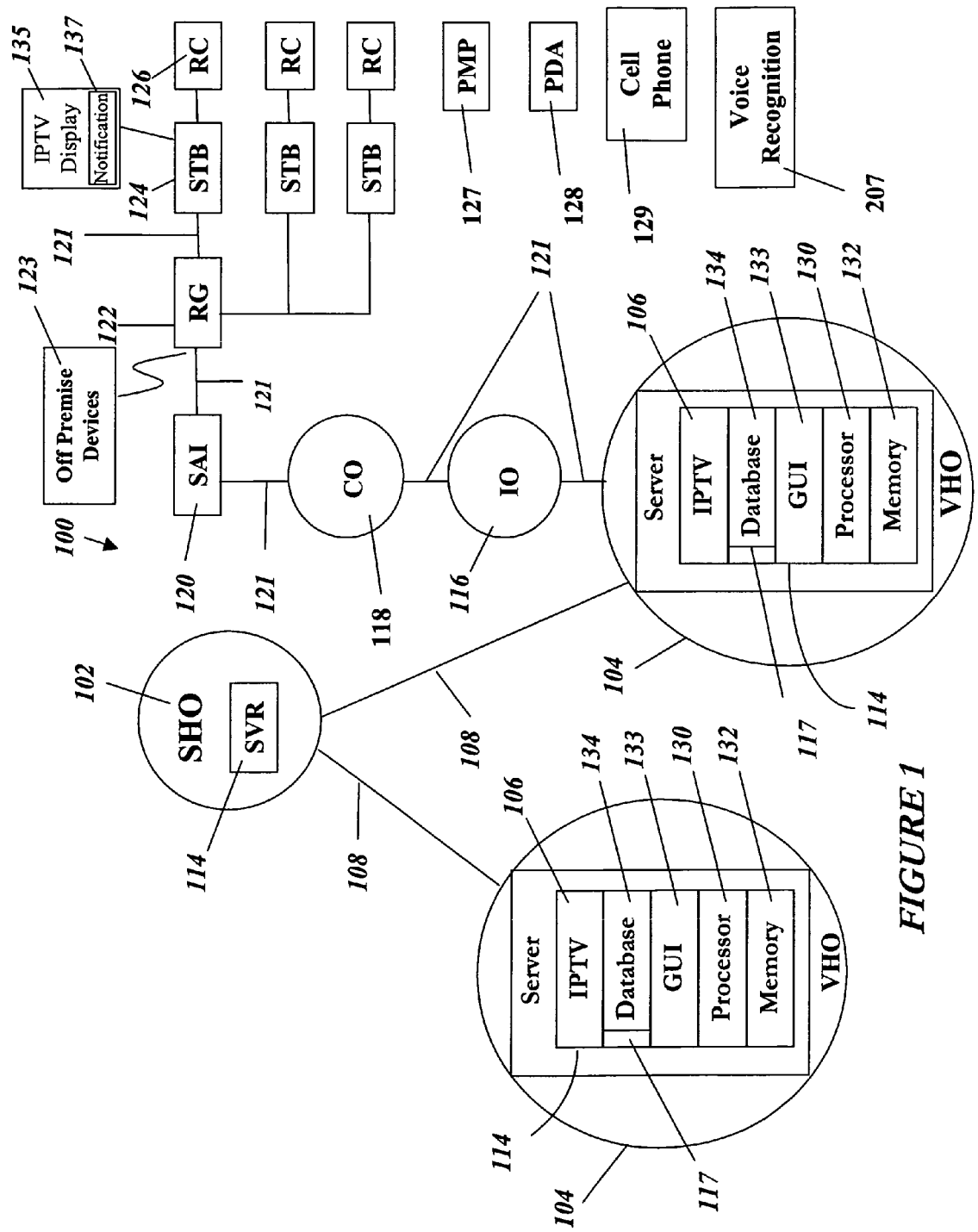
FIG. 1 is a schematic diagram depicting of an illustrative embodiment showing an Internet protocol television (IPTV) network.

In a particular embodiment a method for distributing dynamic event notification data in an internet protocol television (IPTV) system is disclosed. The method includes receiving at an IPTV server the dynamic event notification data indicating an occurrence of a dynamic event; identifying at the IPTV server a current IPTV viewer associated with an IPTV end user client device; retrieving at the IPTV server an event filter for the current IPTV viewer; filtering at the IPTV server the dynamic event notification data through the event filter for the current IPTV viewer; and sending from the IPTV server to an end user client device associated with the current IPTV viewer, the dynamic event notification data when the dynamic event notification data passes through the event filter. In another aspect of a particular embodiment the IPTV end user device is selected from the group consisting of a cell phone, personal data assistant, mobile computer and set top box. In another aspect of a particular embodiment the filter comprises data indicating an event parameter selected from the group consisting of event names, event types, event priorities, event notice levels, current viewer context, event level of interest and context level of interest. In another aspect of a particular embodiment the dynamic event notification data comprises an internet protocol message. In another aspect of a particular embodiment the dynamic event notification data is received by the IPTV server when a threshold is exceeded for a device associated with the end user client device.

In another aspect of a particular embodiment the current IPTV viewer is identified by data selected from the group consisting of biometric data, end user client device location data, viewer context data and user identifier data. In another aspect of a particular embodiment sending further includes determining a priority for the dynamic event notification data; comparing the priority to an event notice level for the current viewer; and delaying the sending of the dynamic event notification data at the IPTV server until the priority exceeds the event notice level for the current viewer. In another aspect of a particular embodiment the priority is determined from a dynamic event type indicated by the dynamic event notification data and the event notice level is determined by a current viewer context. In another aspect of a particular embodiment the dynamic event type is based on a level of interest for the event type and the context is based on a level of interest for the current viewer context. In another aspect of a particular embodiment the context further comprises data selected from the group consisting of current viewer data, current program being viewed data, time of day data and location of the event data.

In another particular embodiment a system for distributing dynamic event notification data in an IPTV system is disclosed. The system includes a processor in data communication with a memory and a computer program in the memory. The computer program further includes instructions to receive at an IPTV server the dynamic event notification data indicating an occurrence of a dynamic event, instructions to identify at the IPTV server a current IPTV viewer associated with an IPTV end user client device, instructions to retrieve at the IPTV server an event filter for the current viewer, instructions to filter at the IPTV server the dynamic event notification data through the event filter for the current IPTV viewer and instructions to send from the IPTV server to an end user client device associated with the current IPTV viewer the dynamic event notification data when the dynamic event notification data passes through the event filter for the current IPTV viewer. In another aspect of a particular embodiment the dynamic event notification data is received at the IPTV server when the dynamic event notification data indicates that a threshold is exceeded for a device associated with the end user client device. In another aspect of a particular embodiment the IPTV end user device is selected from the group consisting of a cell phone, personal data assistant, mobile computer and set top box. In another aspect of a particular embodiment the filter comprises data indicating an event parameter selected from the group consisting of event names, event types, event priorities, event notice levels, current viewer context, event level of interest, and context level of interest. In another aspect of a particular embodiment the dynamic event notification data comprises an internet protocol message. In another aspect of a particular embodiment the instructions to send further includes instructions to determine a priority for the dynamic event notification data, instructions to compare the priority to an event notice level for the current IPTV viewer and instructions to delay the sending of the dynamic event notification data at the IPTV server until the priority exceeds the event notice level for the current IPTV viewer. In another aspect of a particular embodiment the priority is determined from a dynamic event type indicated by the dynamic event notification data and the event notice level is determined by a current IPTV viewer context. In another aspect of a particular embodiment the dynamic event type is based on a level of interest for the event type and the current IPTV viewer context is based on a level of interest for the current IPTV viewer context. In another aspect of a particular embodiment the context further includes data selected from the group consisting of current IPTV viewer data, current program being viewed data, time of day data and location of the event data.

In another particular embodiment a computer readable medium containing a computer program for distributing dynamic event notification data in an IPTV system is disclosed. The computer program includes instructions to receive at an IPTV server the dynamic event notification data indicating an occurrence of a dynamic event; instructions to identify at the IPTV server a current IPTV viewer associated with an IPTV end user client device; instructions to retrieve at the IPTV server an event filter for the current IPTV viewer; instructions to filter at the IPTV server the dynamic event notification data through the event filter for the current IPTV viewer; and instructions to send from an IPTV server to the end user client device associated with the current IPTV viewer, the dynamic event notification data when the dynamic event notification data passes through the event filter for the current IPTV viewer. In another aspect of a particular embodiment the instructions to send further includes instructions to determine a priority for the dynamic event notification data; instructions to compare the priority to a event notice level for the current IPTV viewer; and instructions to delay the sending of the dynamic event notification data at the IPTV server until the priority exceeds the event notice level for the current IPTV viewer.

In another particular embodiment a data structure is disclosed. The data structure includes a current IPTV viewer identifier field for containing data indicative of a current IPTV viewer identity; and an event filter field containing data indicative of an event filter for the current IPTV viewer for filtering dynamic event notification data for the current IPTV viewer. In another aspect of a particular embodiment the data structure further includes an event priority field for containing data indicative of an event priority for comparing to an event notice level for the current IPTV viewer and an event notice level field for containing data indicative of an event notice level for the current IPTV viewer in another aspect of a particular embodiment the data structure further includes an event level of interest field for containing data indicative of a level of interest for the event and a context level of interest field for containing data indicative of a context level of interest for the current IPTV viewer.

In another particular embodiment a method for distributing dynamic event notification data in an IPTV system is disclosed. The method includes sending to an IPTV server from an IPTV end user device the dynamic event notification data indicating an occurrence of a dynamic device event; and receiving from the IPTV server at the end user client device the dynamic event notification data when the dynamic event notification data passes through an event filter for a current IPTV viewer at the IPTV end user device. In another aspect of a particular embodiment the dynamic event notification data is sent to the IPTV server from the IPTV end user device when the dynamic event notification data indicates that a threshold is exceeded for a device associated with the end user client device. In another aspect of a particular embodiment a current IPTV viewer is identified by data selected from the group consisting of biometric data, end user client device location data, viewer context data and user identifier data. In another aspect of a particular embodiment sending further includes determining a priority for the dynamic event notification data; comparing the priority to an event notice level for the current IPTV viewer; and delaying displaying the dynamic event notification data at the IPTV server until the priority exceeds the event notice level for the current viewer. In another aspect of a particular embodiment the priority is determined from a dynamic event type indicated by the dynamic event notification data and the event notice level is determined by a current IPTV viewer context. In another aspect of a particular embodiment the dynamic event type is based on a level of interest for the event type and the context is based on a level of interest for the context. In another aspect of a particular embodiment the context further includes data selected from the group consisting of current IPTV viewer data, current program being viewed data, time of day data and location of the event data.

In another particular embodiment a system for distributing dynamic event notification data in an IPTV system is disclosed. The system includes a processor in data communication with a memory and a computer program in the memory. The computer program further includes instructions to send to an IPTV server from an IPTV end user device the dynamic event notification data indicating an occurrence of a dynamic device event and instructions to receive from the IPTV server at the end user client device the dynamic event notification data when the dynamic event notification data passes through the event filter. In another aspect of a particular embodiment the dynamic event notification data is sent to the IPTV server when the dynamic event notification data indicates that a threshold is exceeded for a device associated with the end user client device. In another aspect of a particular embodiment the computer program further includes instructions to determine a priority for the dynamic event notification data, instructions to compare the priority to an event notice level for the current viewer and instructions to delay displaying of the dynamic event notification data from the IPTV server until the priority exceeds the event notice level for the current viewer. In another aspect of a particular embodiment the priority is determined from a dynamic event type indicated by the dynamic event notification data and the event notice level is determined by a current viewer context. In another aspect of a particular embodiment the dynamic event type is based on a level of interest for the event type and the context is based on a context level of interest. In another aspect of a particular embodiment the context level of interest further comprises data selected from the group consisting of current IPTV viewer data, current program being viewed data, time of day data and location of the event data.

In another particular embodiment a computer readable medium containing a computer program for distributing dynamic event notification data in an IPTV system is disclosed. The computer program includes instructions to send to an IPTV server from an IPTV end user device the dynamic event notification data indicating an occurrence of a dynamic device event; instructions to identify at the IPTV end user device a current IPTV viewer associated with the IPTV end user client device; instructions to retrieve at the IPTV end user device an event filter for the current viewer, instructions to filter at the IPTV end user device the dynamic event notification data through the event filter for the current viewer; and instructions to display at the end user client device the dynamic event notification data from the IPTV server when the dynamic event notification data passes through the event filter. In another aspect of a particular embodiment the instructions to delay further includes instructions to determine a priority for the dynamic event notification data; instructions to compare the priority to a event notice level for the current viewer; and instructions to delay the display of the dynamic event notification data from the IPTV server until the priority exceeds the event notice level for the current viewer.

The event filter is a repository of information and data that describe what a current viewer is interested in hearing about in the form of dynamic event notification on their IPTV end user device. The viewer can use an IPTV user interface to define their filter. The viewer can define event names, event types, event priorities, event notice levels, current viewer context, event level of interest and context level of interest in an illustrative embodiment of the filter.

Event names can include but are not limited to device threshold notices, weather reports, sports reports, email notices, phone call notices and public safety notices. Any number of event names can be defined to be included in the event filter for a current viewer. Event types can be associated with each event name. For example, a device threshold notice may have event types of door ajar; temperature over 82° F., motion detected in back yard, etc. Weather report events can have event types of severe weather warning, routine weather report, vacation weather report, etc. In an illustrative embodiment each event type can have an associated priority. The priority can be determined or set at routine, imminent, urgent or mandatory listed in order of increasing weight.

An event notice level can be set for a particular context. A context can be any number of parameters set by a viewer that in combination define a context. For example, a viewer may define a context as the combination of a particular viewer watching a particular program; such as Dad watching Monday Night Football (MNF). Dad may set his event notice level for this context at imminent. Thus, unless an event name or type occurs having an urgent or mandatory priority, the event will not pass through the event filter and will be sent to the end user device associated with Dad only after the context interest level drops below imminent. Thus, while Dad is watching MNF he will not see any dynamic event notification messages at the end user device where he is viewing MNF unless they exceed a priority level of imminent. Other end user devices, however, may receive the dynamic event notifications during MNF, given they pass through a current viewer event filter associated with the current viewer at another end user device. Context level of interest may be set at routine, imminent, urgent, mandatory and do not disturb (listed in increasing weight) for comparison to an event priority. If a context level of interest is set at do not disturb for a current viewer, dynamic event notification data will not be sent to the end user device associated with the current viewer.

A viewer may also set an event level of interest for particular event types and event names. For example, a viewer may set an event level of interest of mandatory for an email or phone call from an important client. Thus, in the above scenario Dad would receive dynamic event notification data during MNF when an email from the important client is received having an event level of interest of mandatory. Thus, the priority for dynamic event notifications is determined based on the event level of interest. The event notice level is based on the current viewer context.

A viewer may opt-in to receive dynamic event notification data. A pop-up screen may query a viewer to opt-in or an unobtrusive icon or menu selection may appear on an IPTV end user device allowing a viewer to access dynamic event notification to turn them on or off and to set up event filters, priorities and other dynamic event notification as discussed above. The dynamic event notification data can be sent to any end user device accessible by the IPTV network.

In an illustrative embodiment an IPTV notification system interconnects with voice over internet protocol (VoIP) network, email servers and the home security system, the home climate system and the home electrical/lighting systems. This enables users with home automation connected to their residential gateway to receive an IPTV notification when a home event occurs. Types of notification would be contingent on what the user has hooked up to their home network as well as what setting the user chooses (i.e. not everyone wants to know when the lights go on in another room). The notification system could be modified to include triggers or thresholds. Those triggers would be unique based on the type of notification and would be sent to the home gateway. The gateway would read the triggers or compare a device reading to a threshold and create a home "event". A dynamic event notification can be related to an email, phone call, IPTV network related information or a home device exceeding a threshold. A user or the system defines event filters, priorities, levels of interest and context.

In one particular illustrative embodiment the home temperature reaches temperature deemed optimal. When the customer comes home from work on a hot summer day, they may sit down in the living room to watch TV before heading upstairs to change. The customer likely turned on the air conditioner when they arrived home, but since heat rises, the upstairs is still quite warm. Half way through the local news, the upstairs reaches a nice, comfortable 21° C. (70° F.). The user will get a dynamic event notification data on-screen indicating that their bedroom is no longer a sauna and the threshold of 70° F. has been reached.

In another illustrative scenario a door in the house is opened as a customer is watching TV in their bedroom. The dynamic event threshold has been set at opening the door when the house has been secured. Their dog is playing with a chew toy downstairs. All of sudden the dog spots a squirrel outside and manages to pry open the back door to chase it. The customer, who has their security system hooked up to their home network, will receive dynamic event notification data on their television (TV) that the back door has been opened. Concerned that a burglar may have come in, the user promptly heads downstairs with their wireless VoIP phone ready to dial 911. Luckily they notice that it is just their dog, Spot messing with local wildlife. The user can then close the back door and lock it to prevent heat loss or burglary and return to watching the TV.

In another particular illustrative embodiment scenario lights in the children's room go on. Jenny is having a sleepover with her friend Kendra. Jenny's mom is downstairs watching TV and hoping fervently that the girls will go to sleep before midnight. Jenny's house uses home controls for the lighting system; they are connected wirelessly with the home gateway. While watching an infomercial for the spin-o-matic at 2 a.m., Jenny's mom receives dynamic event notification data on-screen at the IPTV monitor that the lights in Jenny's room have been turned on. Expecting to have to lecture the girls, she heads upstairs only to find that Kendra is having an allergic reaction to the shellfish they had eaten earlier that night. Thanks to the notification on-screen Jenny's mom knew to head upstairs and subsequently gives Kendra the Benadryl that she had in her overnight bag.

In an illustrative embodiment the platform inter-connects with the home security system, the home climate system and the home electrical/lighting systems. This would enable users with IPTV service who are receiving dynamic event notification data to create the appropriate home environment in order to respond to the notice.

In a particular embodiment of the present invention the user receives a dynamic event notification data an EAS (emergency alert notice) system via an IPTV network. A tornado is approaching a town in Kansas. The Video Hub Office (VHO) in the local area receives the emergency alert and injects it into the IPTV service. Users of the IPTV network across the area receive a notice on-screen informing them of the approaching danger. The notice passes through the residential gateway in order to get to the TV. The gateway reads an alert flag on the notice, and realizes that it is an emergency alert. The gateway then sends a signal to the home lighting system (which is also be connected to the gateway) to flicker the lights in the home warning people of the danger. This use case would alert people who aren't even watching their IPTV service or make sight-impaired viewers aware of the oncoming tornado.

In another particular embodiment the user receives Caller ID dynamic event notification data. VoIP calling is associated with the IPTV user account. The IPTV system is thus aware when the user receives an incoming call. When the caller ID notice appears on screen the Notification system simultaneously triggers the client device STB or embedded DVR to pause the current show or lower the volume so that the user may answer the phone without having to reach for the remote control. All of the event triggers on thresholds above may be customized by type of notification as a menu item in the IPTV user interface. In another particular embodiment a dynamic event notification data is sent to an end user device that may be a cell phone, pda, laptop computer or any other wired or mobile device capable of receiving a message from the IPTV network server.

In another particular embodiment the user receives email pending dynamic event notification data. Internet accounts are connected through a gateway for identity management solutions and will have a trigger placed on it when the user receives an incoming email. That trigger will enable the dynamic event notification system to put an envelope icon on-screen indicating that an email has arrived. Once the notification system is triggered to place the icon on-screen, it can also send a trigger to home controls system connected through the residential gateway. Incoming emails may trigger the lights to go on in the home office, enabling the user to log onto their email service. Alternatively, they may trigger the A/C in the office to ensure that the user is comfortable for an evening of perusing email.

The dynamic event notifications are passed through a current viewer event filter associated with the current IPTV viewer. Only events appearing in the current viewer event filter are reported to the current viewer.

A particular illustrative embodiment includes but is not limited to a client device such as a set-top box (STB) with an integrated client (IC) for receiving adhoc or spontaneous dynamic message data and for monitoring and controlling a device state for a group of controllable devices for performing home monitoring automation. The terms STB and IC are used interchangeably herein to indicate an STB with an IC. The IC can communicate through any suitable gateway, such as an integrated residential gateway (RG) to access a server hosting an internet protocol television (IPTV) server. The term IPTV is used herein to mean a digitized television signal set over a digital network such as the Internet that is television over internet protocol (TVoIP). As an example of TVoIP, the IPTV example of the illustrative embodiment is used as a non limiting example of an illustrative embodiment system for providing TVoIP or IPTV. The term IPTV is not intended to limit the disclosure to any specific implementation of a system for providing digital television and video delivered over the internet or TVoIP. The terms IPTV and TVoIP are used herein interchangeably. Microsoft Corporation has a project referred to as IPTV which is intended to deliver digital television over the Internet; however, this description or disclosure is not limited to any particular vendor's implementation of IPTV or TVoIP, including but not limited to Microsoft's implementation of digital television delivered over the internet.

Turning now to FIG. 1, a residential gateway, RG is shown in an illustrative embodiment, however, any gateway that provides communication between the IC and the servers 106, 138, 114 and 133, is suitable, including but not limited to commercial, industrial, multiple dwelling unit and office gateways. An IPTV UI data for formatting the UI at a client and presentation of device state data and home automation data at the client is stored at a database accessible to an IPTV server 106. Home automation controllable devices 123 (herein after "controllable devices") operational states are represented in a device state data structure stored in a database at a control server 138. The IC monitors and receives the device state data from the control server for all controllable devices in a home. The IC controls the controllable devices setting them to the device settings in the device state data.

The dynamic event notification data is inserted into the video stream at the IPTV server or at the STB or other client device and displayed to the current IPTV viewer.

The IC communicates with the IPTV server and control server through an integrated interface or through an interface such as RG 122. The RG 122 can be integrated into IC (STB) 124. The device state for the controllable devices can be monitored and controlled by a subscriber through the UI. The UI may be displayed on a television set or any other IPTV end user device accessible by the IPTV network or a computer through the RG or STB or at remote devices away from the home, such as a cell phone, PDA and laptop. Likewise, dynamic event notification data can be sent to any of those devices. Multiple UI formats and device state data sets for a number of client devices are stored in the database. Thus the UI can be sent to multiple clients and the device state data presented on multiple clients. The UI and dynamic event notification data format for a cell phone could be different the format for a television or PC. The device state data presented in the UI and the dynamic event notification format may change between end user or client devices. The terms end user and client devices are equivalent and used interchangeably in this disclosure. The UI enables a subscriber to set up dynamic event filters and associated data and to control the operational state of existing home automation controllers, devices, and security systems from a client device such as the IC or a remote cell phone. The client devices can also receive IPTV video content and device monitoring data and video streams.

In an illustrative embodiment the IC communicates with and monitors the existing controllable devices in the home through a wireless network using wireless protocols or through existing home wiring, or power-line technology, such as Home-Plug and UPB, other communication networks and protocols can be used including X10, Zigbee, ultra wide band (UWB) and Insteon. The IC controls the states of the controllable devices according to the device state data by sending control commands to the controllable devices to turn on lights or stream video data from a front porch video camera when the door bell rings.

The illustrative embodiment provides an IPTV and control server based home and network event monitoring system. UI data is provided that resides on a database accessible to the control server 138 and the IPTV server 106. An IC and user remote control (RC) are provided to enable the user to use the RC to provide input to and communicate with the UI through the IC to alter UI data and the device state data. The UI data is displayed on an IPTV UI format display such as on a television or on a mobile display device such as a cell phone. A subscriber can conveniently access the UI data through the formatted UI presentation of the UI data on a display screen to control home automation and content from the comfort of their home sofa or from a remote location via a laptop computer, cell phone or PDA. The UI can be accessed from the IC via an integrated RG through any STB or television RC location in the home. The UI can also be accessed remotely through the control server by remote devices through Wi-Fi, local or remote wireless networks. The UI data can be accessed by numerous other end user client devices in and away from the home including but not limited to personal media players (PMP), advanced remote controls, LCD's, laptop computers, personal computers, and verbal input through a voice recognition system.

As stated above, a viewer can define a context for himself watching Monday Night Football, including an event notice level (routine, imminent, urgent, mandatory, and do not disturb). The event notice level is compared to a priority for a dynamic event notification data (routine, imminent, urgent and mandatory). The dynamic event notification data is delayed (held and not sent or display to the end user device) unless the priority exceeds the event notice level for the current viewer and current context.

In an illustrative embodiment, a server database is provided for storing the device states data. The device states data can be manipulated by accessing the UI. The UI resides off-site in the IPTV network server database for on-going software updates and programming. Dedicated STB remote buttons are provided for macros, such as all home lights mode on or panic mode, such as all lights flashing during an intrusion or breach of security. In this case an intrusion alert from the IC can be sent over the IPTV network to a security monitoring agency such as police, fire and emergency medical. An advanced IC remote control (RC) is provided for user input to the UI to access and interact with additional features and controls including but not limited to intelligent management for energy savings, home theatre control, security control and more.

In one particular embodiment, IC communication interfaces are provided to existing home monitoring or security systems. In an illustrative embodiment the IC can communicate over existing home wiring using power-line or wireless technologies for changing the state of controllable devices by controlling the devices according to the device state. Controllable devices can be monitored and their device state controlled, that is, the devices can be turned on and off, variably controlled as to direction, speed and power. The illustrative embodiment provides a database for storing business rules data, content data, context data and device states data. The business rules are applied to the content, device state data and context data to reconfigure the device states in the database which are sent to the IC for setting a device state in the controllable devices, for example, in a home or business.

In a particular embodiment a user can access the UI data to communicate with an STB with IC having a digital video recorder (DVR) and a media server containing video, music, photos, etc. Home automation system reporting and analysis is provided at the control server by the home automation system.

Reporting includes reporting dynamic event notification data to the control server through the IC on device performance, environmental factors and device usage. Usage reporting can be conducted on or by individual devices or appliances in the home including but not limited to devices such as, refrigerators, air conditioners, swimming pools and lights. Reporting can be tied to content data or context data. For example, refrigerator contents data can be inventoried by user interaction with the UI, such as verbal announcement to the voice recognition system or by scanning in by bar code identifying products like in a supermarket checkout line and reported to subscriber on demand. A business rule may be configured to monitor IPTV content data and display refrigerator contents data when a commercial break is encountered during a football game. Washers, dryers, microwaves, heating/cooling, and pool/hot-tub usage, can be monitored, reported and controlled. A particular embodiment can provide business rules to use weather stations reports to the control server to provide weather related home automation features to change the device state to control shutters during high winds, blinds synchronized with the sun, sprinklers run according to recent cumulative rainfall, windows/ventilation systems, and temperature and humidity control to optimize energy efficiencies.

In another particular embodiment an STB with IC for Home and Media Controller (hereafter referred to as "IC" and used interchangeably with STB to mean an STB with integrated home and media controller) is provided. The IC provides an IP based home and network monitoring solution that integrates content (entertainment video and RDP applications) with advanced home device monitoring control features. Applications can also be hosted at the VHO server. IC automation features include but are not limited to monitoring lighting, security, surveillance, temperature, and energy management. Video monitoring includes but is not limited to home theater control, diagnostics and reporting capabilities. The IC control seamlessly integrates advanced home and network monitoring using infrared (IR), internet protocol (IP), radio frequency (RF), wireless and power line communication protocols. The IC can be integrated into an STB which can include but is not limited to an STB used for decoding CATV, IPTV, and/or Satellite video applications. The IC leverages existing STB functionality and connectivity to consumer A/V electronics including access to personal media content such as internal external digital video recorder (DVR), personal video recorder (PVR), PMP or storage devices and personal computers.

An IC is described in the illustrative embodiment which is capable of providing home monitoring in any room in the home through the IC and a home communication network. In an illustrative embodiment, the IC integrates infrared (IR), IEEE 1394, RS-232, radio frequency (RF), component video, composite video, S-video, DVI, HDMI, optical, Ethernet, RJ-11, audio in/out, video in/out, and speaker out connectivity to the home theater consumer electronics equipment.

In an illustrative embodiment, the IC communicates to other STB's and home devices throughout the home using communication networks including but not limited to a wireless mess network, Ethernet, Wi-Fi, Zigbee or power line distribution methods including but not limited to Zwave, universal power bus (UPB), and Insteon protocol. The IC also communicates with and monitors, sensors, detectors, thermostats, outlet dimmers, outlet switches, smoke detectors, fire detection systems, video cameras, carbon monoxide detectors, contacts, proximity sensors, security systems, gas detection devices, irrigation equipment, energy measurement, load control, air conditioning, humidity control, heating equipment, dimmer switches, switches, smart appliances, pool/spa, home theater, shades, blinds, drapes, projection screens, mounts, lifts, fan speed, remote dimmers, etc. The IC can be accessed and controlled by remote controls, remote wireless devices, touch pads, key pads, LCD's, key fobs, PDA's, PMP's, Cell Phones, computers, etc. The IC may access an IPTV server to request to receive a device state from the control server to configure controlled devices in the home according to the device state. In a particular embodiment, the IC may exist on the IPTV server.

Turning now to FIG. 1, FIG. 1 is a schematic diagram depicting an IPTV network 100 in accordance with an illustrative embodiment. As shown in FIG. 1, the IPTV network 100 includes but is not limited to a super hub office (SHO) 102 for acquisition and encoding of information and data such as video content; a video hub office (VHO) 104 in each demographic market area (DMA) for delivery of the content; intermediate offices (IO) 116 and central offices (CO) 118 locations in each metropolitan area for distribution of the content; a service area interface (SAI) access network between the COs and multiple or single dwelling units; and the in-home network with residential gateway (RG) 122. The SHO, VHO, IO and CO may be located in separate geographic regions (nation, region, state, metropolitan, and city) to communicate to subscribers over high-speed digital communication lines 108.

A server 114 can be placed at the SHO 102 to acquire and redistribute content and data to the VHOs 104 which may be spread across a large geographic region such as a country, such as the United States, England or France. The SHO may be provided in a geographically central location for acquisition of national-level broadcast TV programming. The SHO can be the central point of on-demand video content acquisition and insertion of content into the IPTV network. Video content may include but is not limited to all displayable visual and audio content including movies, games and television programs. Video content can be received at the SHO 102 via satellite and processed for delivery to the VHOs 104. On demand video content can be received from various sources and processed for code/decode and bit-rate requirements for the IPTV network for transmission to the VHOs over high-speed communication links 108. Video content from a SHO server 114 can be redistributed to the VHOs 104 toward the subscriber via the intermediate offices (IOs) 116 and the central offices (COs) 118. The COs are connected to the IOs to further distribute video content toward the subscribers. A subscriber communicates with the IPTV server 106 and the IC 124 communicates with the control server 138 over an IP link 121 between IC 124 and servers 183, IPTV server 106 and control server 138.

The VHOs 104 can receive national content from the SHO 102 video server 114. The VHOs are the video redistribution points within each designated market area (DMA) or geographic region. Application systems, regional subscriber database systems, VOD servers, and fast channel-change servers can be located in the VHO. In a particular illustrative embodiment at least one IPTV server 106 and control server 138 are placed at each VHO server. Each of the servers 114, 106, 138, 183 includes a processor 130, memory 132 coupled to the processor 130, database 134, and GUI 133. The memory 132 can include a computer program that is embedded in the memory 132 that can include logic instructions to perform one or more of the method steps described herein. Additionally the database 134 containing the device control state 117 is coupled to the processor 130. The dynamic event notification data is displayed as a notification 137 on IPTV display 135.

IPTV subscriber activity data can be collected at the IPTV server 106 from all subscribers associated with a particular server at a VHO and stored in the database 134 for global analysis between multiple IPTV subscribers. Global context and alert messages can be created sent to IPTV subscribers based on a survey of subscriber activity data stored in the database from multiple RGs or IPTV subscribers. The subscriber activity data can be used to identify current IPTV viewers at particular IPTV end user devices by biometric trends and characteristic of each viewer associated with a particular end user device, e.g., a STB.

IPTV network content data, video data and messages data, UI data and the device state data is communicated to the IC through a gateway, such as a subscriber IC with integrated RG 122 and can be sent at least partially via either fiber to the node (FTTN) or fiber to the premises (FTTP) optical communication links. In another embodiment, other communication links between the IC and the servers are provided which are suitable including wireless or any other communication mode that may be suitable for transmission of video and data over a communication network including but not limited to an IP network. FTTN equipment, located at communication interface such as a serving area interface (SAI), can be connected to the CO. FTTN equipment may also be located in the CO. Toward the subscriber household, a network interface device (NID) and integrated RG 122 with a built-in very high data rate digital subscriber line (VDSL) modem or optical network termination (ONT) can be installed as the customer premise equipment (CPE).

In one particular embodiment the integrated RG can be connected to the additional STBs 125 in the home via an internal network such as an Ethernet. Each STB has an associated RC 126 which provides user selections and data entry to the UI presented on an STB display 179 to control the IPTV selections and UI from the IPTV platform. Interaction with the control server and UI is also provided at the remove devices. UI interaction and associated home automation device state and information (such as video from a surveillance camera in the home) and data can also be sent to and from remote devices such as but not limited to a PMP 127, PDA 128, cell phone 129 and voice recognition 207 system, through the control server 138. Remote devices can send various types of data to the IC. Video from a mobile cell phone video camera or mobile video camera can be streamed through the control server to the IPTV server and sent to the IC for display in a pop up window display area in the GUI display.

In an illustrative embodiment a current IPTV viewer is identified and context defined by analyzing the subscriber activity data. The subscriber activity data from a particular identified subscriber, including but not limited to IPTV UI inputs data, device states data, subscriber identification data, alerts data, IPTV channel selection data, IPTV control inputs data and IPTV data entry, is collected from each STB in a household. The subscriber activity data may be collected and transmitted from the RG to an IPTV server 106. Subscriber activity data may also include input to the UI at the IPTV server from a wireless device located outside of the home. In the illustrative embodiment an IPTV server 106 exists in each VHO. The subscriber activity data can be collected periodically at each IPTV server 106 or in real-time from each RG or other suitable communication gateway and stored in the database 134. Biometrics, end user client device location, server content and viewer identifier data are derived from the subscriber activity data. Subscriber activity data for particular viewers including typing patterns, viewing devices, finger prints and voice prints can be stored as biometric data and used to characterize and identify current viewers.

In a particular illustrative embodiment, each IPTV server 106 transmits the subscriber activity data to a single database 134 for global analysis and trending. Global alert messages can be sent, as business rules dictate, for global events such as severe weather, fire, terrorist threats, Amber alerts, and other global or regional events can be sent to IPTV subscribers based on analysis of subscriber activity data collected at the database 134. Thus a fire alert reported in one IPTV subscriber household can be reported to the fire department and neighboring households, including IPTV subscriber households. The database 134 may be a commercial database such as provided by Oracle running on a Sun Microsystems processor. Other processors and database systems are suitable for use with the illustrative embodiment as well.

The IPTV server periodically collects the subscriber activity data from each VHO and stores it in the database. The IPTV server may also operate in real time to collect the data from the VHOs. The subscriber activity data from each VHO is pulled by the IPTV server periodically or can be collected in real time and relayed to the IPTV server. Real time data collection by the control server 138 enables real time data analysis for iterative configuration of the device state, global alert messages and dynamic management of content and home automation from the control server 138. A bank of servers 183 is provided at the VHO, including an IPTV server 106 and a control server 138.

Each of the servers in the bank of servers 183 includes a processor 130, a memory 132 coupled to the processor 130, a database 134, and access to UI 133. In a particular embodiment the memory 132 can include a computer program that is embedded in the memory 132 that can include logic instructions to perform one or more of the method steps described herein. Additionally the database 134 is coupled to the processor 130 containing the device control state 117.

The IC 124, and STBs 125 may forward the subscriber activity data to the RG which in turn sends the subscriber activity data to IPTV server 106 via a communication path 121 between the VHO and an associated RG. Substantially all subscriber activity data including but not limited to content selection, device states, business rules and remote control activity is recorded as subscriber activity data at the IPTV server 106 database. The processor 130 may be implemented as a Sun Microsystems processor. The STB can contain a single microprocessor and memory, or may be implemented as multiple microprocessors and memories located at a single location or at several locations.

A downstream signal from the IPTV server 106 or control server 138 to a RG, display device or IC includes but is not limited to UI data, device states data, and content data for display on the display device associated with the recipient client, such display 170 associated with IC 124. An upstream signal through the RG from the home display device, RG or STB to the IPTV or control server includes but is not limited to dynamic event data, device state and subscriber activity data including but not limited to channel selections, UI input and any other input from the RC, STB or other remote wireless device with access to the server. The device states data can be communicated directly to the control server 138 for conversion into an IPTV format UI and sent from the IPTV server to the client device as an IPTV UI. The UI shows device states as icons, pictures, graphics text, and can also display video from a remote device or a home controllable device in pop up windows 170 on the UI. The device states can be controlled in conjunction with sending dynamic event data. For example, an urgent tornado dynamic event data can be accompanied by a device state that blinks the house lights off and on.

Figure 2:
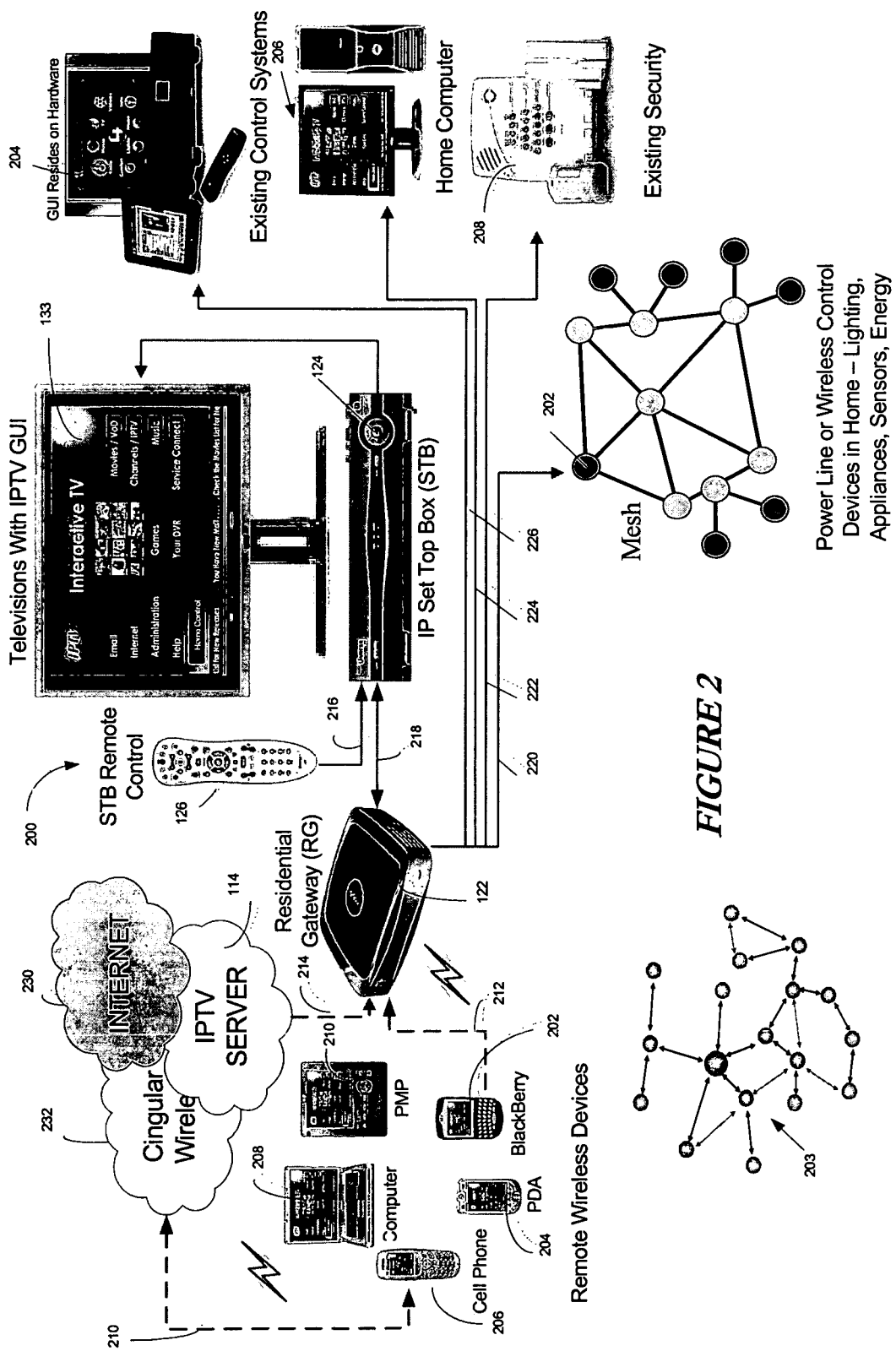
FIG. 2 is a schematic diagram depicting an illustrative embodiment showing a user interface (UI) screen for setting thresholds for devices in a home.

Turning now to FIG. 2, in an illustrative embodiment IPTV UI 133 data is provided from the IPTV server 106 to configure viewer filter data and context data in the database 134. The device state data is subsequently sent from the control server to the IC through the RG for controlling controllable devices on a wireless mesh network 202, a power line network 203, existing home security system 208, existing control system 204 or a home computer 206. The subscriber uses the IPTV UI data to interact with the IPTV server 106 and control server 138, which can be installed at the bank of servers 183 in the VHO 104. A subscriber uses a remote control 126 or remote wireless devices mobile email 202, PDA 204, cell phone 206, computer 208, or personal media player 210 to provide input to the UI data at the IPTV server 106 on the servers 183.

The cell phone 206 interfaces or communicates through a wireless network or wired network 232 to the control server 138. The remote wireless devices interface to the control server through wireless link 212. The IPTV server 106 interfaces with the RG 122 over a network link 214. The RG communicates with an IC 124 over communication link 218. The RC 126 communicates with the IC 124 over communication link 216. The RG communicates with the wireless mesh network and the power line network 202 over communication link 220. The RG communicates with existing home security over communication link 222. The RG communicates with the home computer system 206 over communication link 224. The RG communicates with the existing control system over communication link 226.

Figure 3:
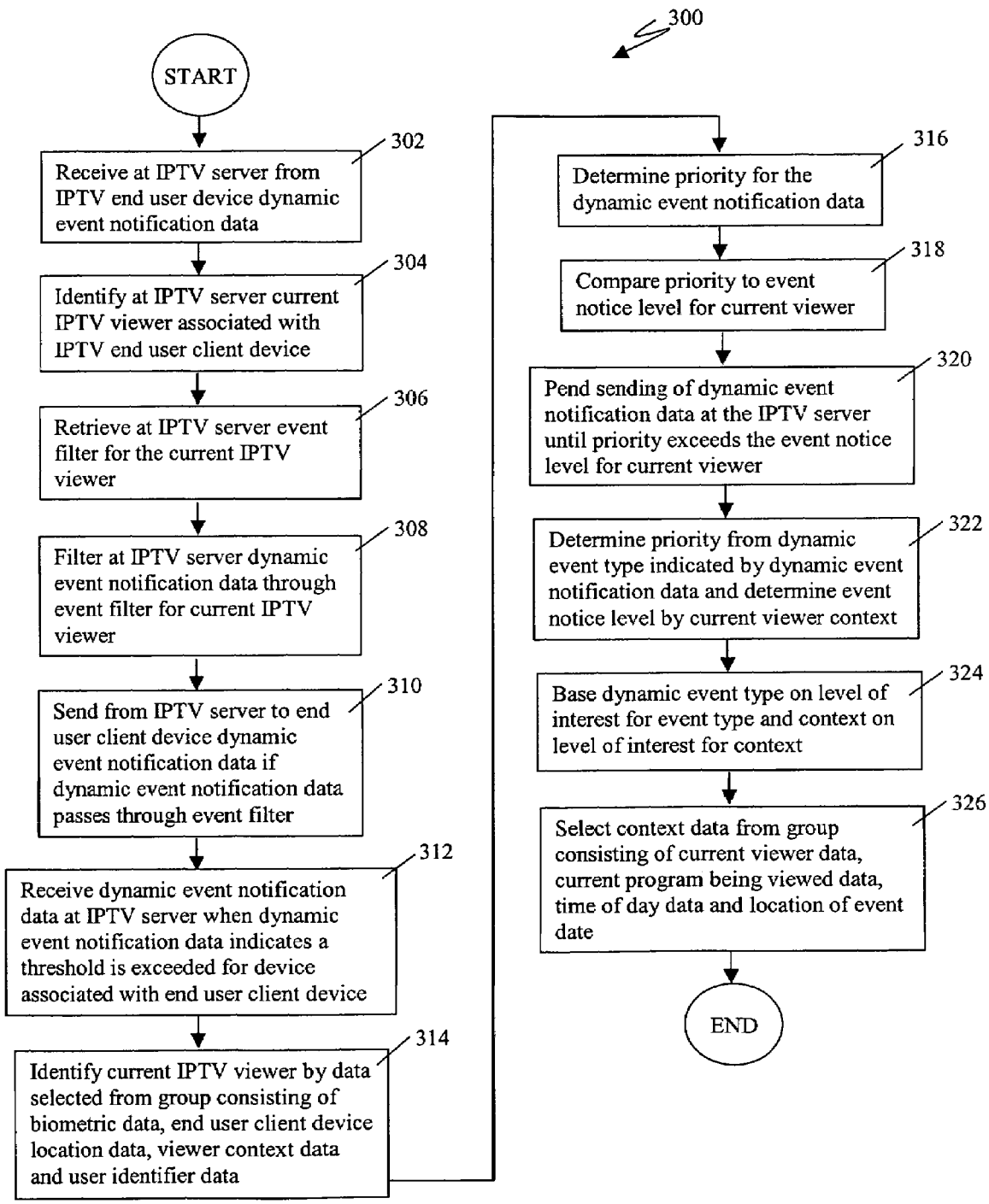
FIG. 3 depicts a flow chart of functions performed in an illustrative embodiment.

Turning now to FIG. 3, a flow chart is depicted illustrating functions performed in an illustrative embodiment. Dynamic event notification data is received at the IPTV server from the IPTV end user device at block 302. Current IPTV viewer associated with the IPTV end user device is identified at the IPTV server at block 304. Event Filter for the current IPTV viewer is retrieved at the IPTV server at block 306. The event filter is stored in a database accessible to the IPTV server. Dynamic event notification data is passed through event filter for the current IPTV viewer at the IPTV server or at the STB at block 308. Dynamic event notification data is sent from IPTV server to the end user device if the dynamic event notification data successfully passes through the event filter at block 310. Dynamic event notification data for an event is received at the IPTV server when the dynamic event notification data indicates a threshold is exceeded for the device associated with the end user client device at block 312. Dynamic event notification data is also sent to the IPTV server for cell phone calls, emails, credit card purchases, and any other events that may be detected or reported in the IPTV network and associated with the current IPTV viewer.

The current IPTV viewer is identified by data including but not limited to biometric data, end user client device location data, viewer context data and user identifier data at block 314. For example, Mom may be the only viewer who accesses IPTV on the end user device STB in her study. Thus this STB location may be associated with Mom the viewer. Biometric data identifies a current viewer by the characteristics of the viewers input to the IPTV system, such as channel switching activity and application usage (gaming, movies, etc.) or any other input that may be used to characterize an identity for a current viewer. Biometric data is gathered, stored and compared to viewer profiles containing past biometric trend data. The viewer context can be determined from the time of day, current viewer activity such as what program is being watched, and/or any other type of viewer activity that may be used to identify a viewer. The user identifier data may be entered by a current viewer via the UI upon request by the system or upon request by the viewer to enter a user identifier so that dynamic event notification data can be sent to the current viewer during their IPTV viewing period.

Priority for the dynamic event notification data is determined at block 316. Priority is compared to the event notice level for the current viewer at block 318. Sending of the dynamic event notification data is delayed at the IPTV server until the priority exceeds the event notice level for current viewer at block 320. Priority is determined from the dynamic event type indicated by the dynamic event notification data and the event notice level is determined by the current viewer context at block 322. The dynamic event type is based on the level of interest for the event type and the context is based on the level of interest for the context at block 324. The data is selected from the group consisting of the current viewer data, current program being viewed data, time of day data and location of event date at block 326.

Figure 4:
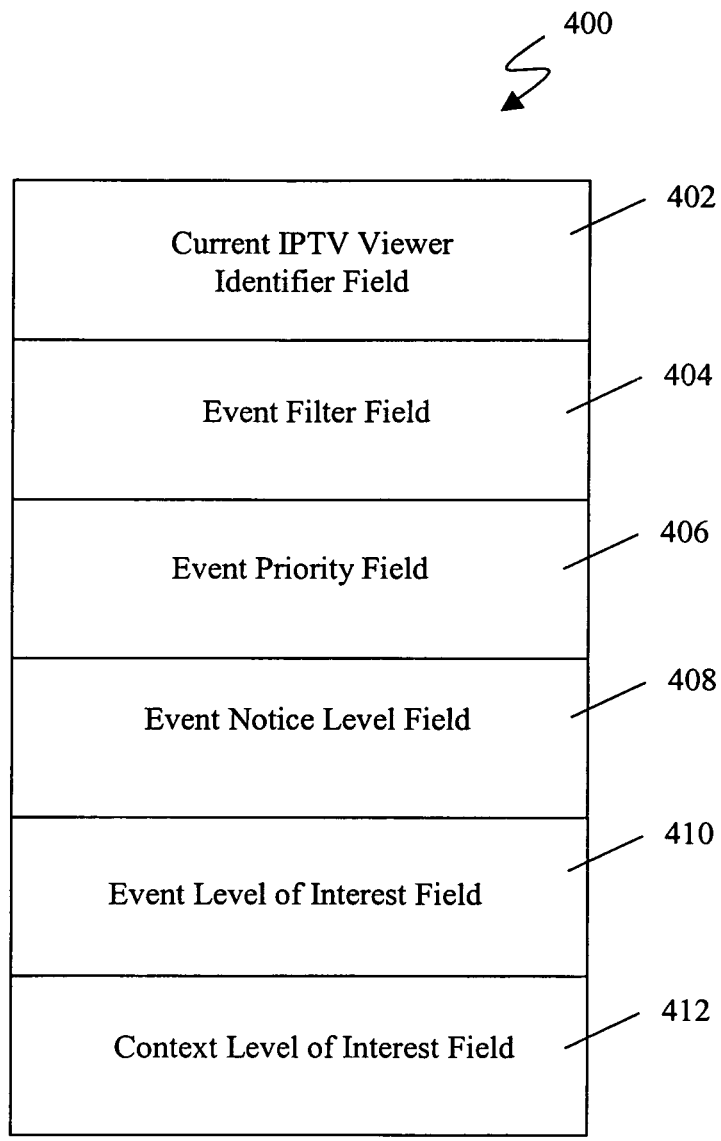
FIG. 4 is a is a schematic diagram depicting another illustrative embodiment showing a data structure.

Turning now to FIG. 4, a data structure 400 is disclosed including a current IPTV viewer identifier field 402 for containing data indicative of a current IPTV viewer, an event filter field 404 for the current IPTV viewer for containing data indicative of a current IPTV viewer filter for filtering dynamic event notification data for the current IPTV viewer, an event priority field 406 for containing data indicative of an event priority for comparing to an event notice level for the current IPTV viewer. The data structure may further include an event notice level field 408 for containing data indicative of an event notice level for the current IPTV viewer, an event level of interest field 410 for containing data indicative of a level of interest for the event, and a context level of interest field 412 for containing data indicative of a context level of interest for the current IPTV viewer.

Figure 5:
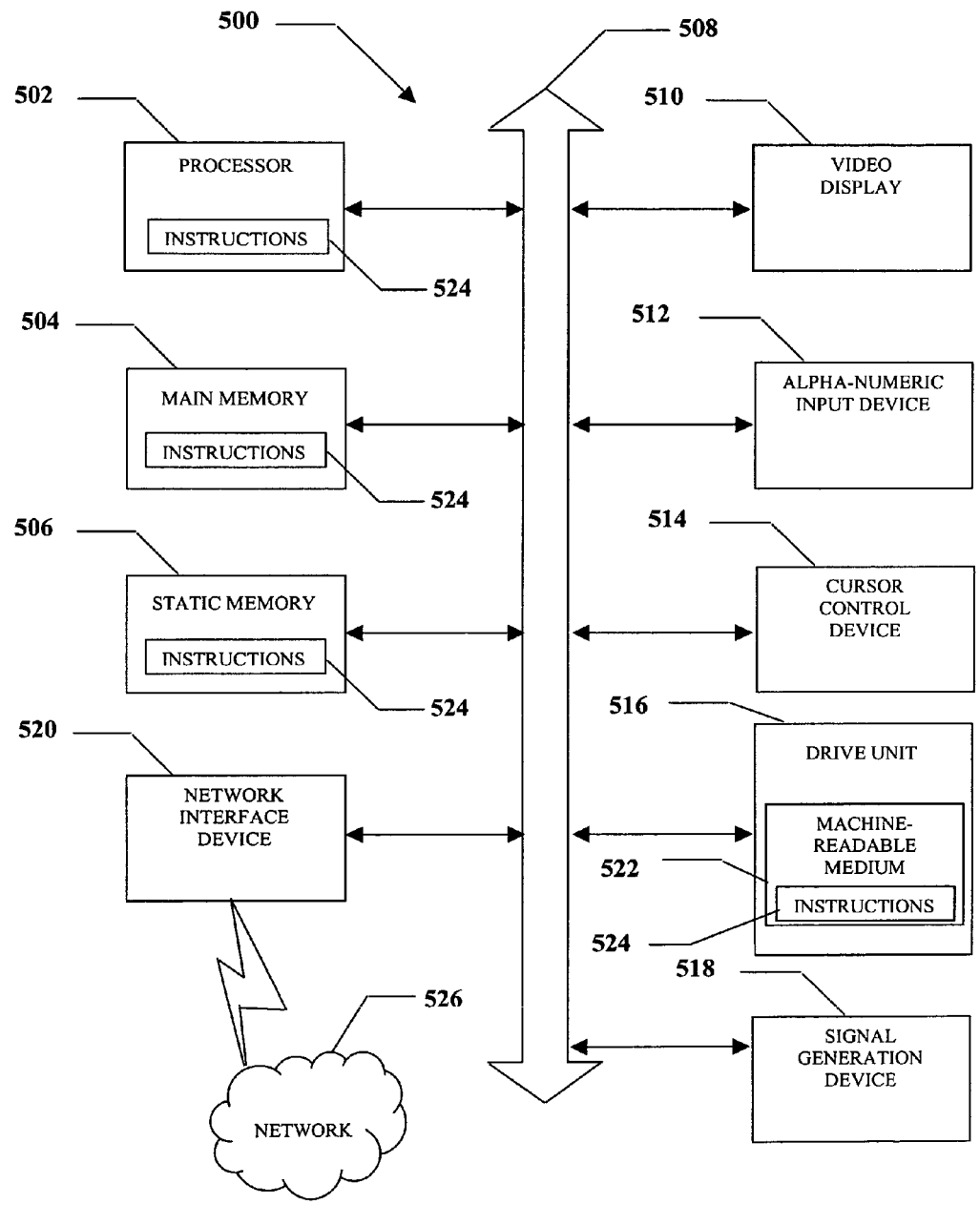
FIG. 5 is an illustrative embodiment of a machine for performing functions disclosed.

FIG. 5 is a diagrammatic representation of a machine in the form of a computer system 500 within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a set-top box (STB), a Personal Digital Assistant (PDA), a cellular telephone, a mobile device, a palmtop computer, a laptop computer, a desktop computer, a personal digital assistant, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine. It will be understood that a device of the present invention includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 500 may include a processor 502 (e.g., a central processing unit (CPU), a graphics processing unit (GPU), or both), a main memory 504 and a static memory 506, which communicate with each other via a bus 508. The computer system 500 may further include a video display unit 510 (e.g., a liquid crystal display (LCD), a flat panel, a solid state display, or a cathode ray tube (CRT)). The computer system 500 may include an input device 512 (e.g., a keyboard), a cursor control device 514 (e.g., a mouse), a disk drive unit 516, a signal generation device 518 (e.g., a speaker or remote control) and a network interface device 520.

The disk drive unit 516 may include a machine-readable medium 522 on which is stored one or more sets of instructions (e.g., software 524) embodying any one or more of the methodologies or functions described herein, including those methods illustrated in herein above. The instructions 524 may also reside, completely or at least partially, within the main memory 504, the static memory 506, and/or within the processor 502 during execution thereof by the computer system 500. The main memory 504 and the processor 502 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present invention, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present invention contemplates a machine readable medium containing instructions 524, or that which receives and executes instructions 524 from a propagated signal so that a device connected to a network environment 526 can send or receive voice, video or data, and to communicate over the network 526 using the instructions 524. The instructions 524 may further be transmitted or received over a network 526 via the network interface device 520.

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the invention is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

In another illustrative embodiment a user can select a video or audio stream to be sent to an external audio or video device outside of the home via the IPTV network. In another illustrative embodiment a user can receive a video or audio from the house from a remote receiver or IP device and/or establish video or audio communication between the remote location and the audio and/or video devices in the home. In another illustrative embodiment motion detection on a camera sends alert to an STB of viewers with who a viewer wishes to communicate, alternatively email/SMS to additional device. In another illustrative embodiment, with management of available viewers at STBs and a buddy list to set up video sessions or audio with friends and neighbors. In another illustrative embodiment peer to peer video distribution "live broadcast" is provided.

In another illustrative embodiment a method for monitoring home remotely or controlling appliances in home via IPTV interface/portal is provided. Technologies to use are Zigbee, XIO, or RF remotes.

In another illustrative embodiment, IPTV user interface is provided for that contains easy wizards to (1) identify Zigbee and RFID supported devices dynamically and incorporate functionality into the control interface, (2) let user set up X10 control codes for various appliances based on what she has configured in her home, (3) include smart remote capability to let user define other audio and/or video equipment in the home and where it is, so RF can be used to control other devices (and in this case the "closest" STB could be used to transfer the RF signals if it is with the other audio and/or video equipment to be controlled).

It should be noted that while the preferred embodiment of this video distribution architecture utilizes a FTTN or FTTH broadband network for IPTV delivery, it could similarly be implemented to work on alternative access networks including digital cable networks, satellite television systems, terrestrial wireless delivery networks (e.g. WiMAX) as bandwidth improves, or even 3G and 4G wireless networks using wireless handsets as the video authoring station.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims.

In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for distributing dynamic event notification data in an internet protocol television system comprising:
   identifying a plurality of end user devices associated with a current viewer in the internet protocol television system;
   determining a priority for an event associated with the current viewer;
   determining a first context for the current viewer, based on a first plurality of different parameters comprising the current viewer watching a particular program on a first one of the plurality of end user devices;
   determining if the priority exceeds an event notice level for the first context;
   determining if the priority exceeds an event notice level for a second context for a second one of the plurality of end user devices; and
   upon determining that the priority exceeds the event notice level for the first end user device, sending from the internet protocol television server to the first end user client the dynamic event notification data; and
   upon determining that the priority does not exceed the event notification level for the first end user device and determining that the priority exceeds an event level of interest for the second end user device, sending from the internet protocol television system to the second user client device, the event notification data.

2. The method of claim 1, wherein the internet protocol television end user device is selected from the group consisting of a cell phone, personal data assistant, mobile computer and set top box.

3. The method of claim 1, wherein the dynamic event notification data comprises an interne protocol message.

4. The method of claim 1, wherein the current internet protocol television viewer is identified by data selected from the group consisting of biometric data, end user client device location data, viewer context data and user identifier data.

5. The method of claim 1, wherein sending further comprises:
   determining a priority for the dynamic event notification data;
   comparing the priority to a event notice level for the current viewer; and
   delaying the sending of the dynamic event notification data from the internet protocol television server until the priority exceeds the event notice level for the first context.

6. The method of claim 5, wherein the priority is determined from a dynamic event type indicated by the dynamic event notification data and the event notice level is determined by the context.

7. The method of claim 6, wherein the dynamic event type is based on a level of interest for an event type and the context is based on a level of interest for the context.

8. The method of claim 7, wherein the context further comprises current viewer data, current program being viewed data, time of day data and location of the event data.

9. A system for distributing dynamic event notification data in an internet protocol television system, the system comprising:
- a processor in data communication with a memory in a non-transitory computer readable medium; and
- a computer program in the memory, the computer program further comprising instructions to identify a plurality of end user devices associated with a current viewer in the internet protocol television system;
- instructions to determine a priority for an event associated with the current viewer;
- instructions to determine a first context for the current viewer, based on a first plurality of different parameters comprising the current viewer watching a particular program on a first one of the plurality of end user devices;
- instructions to determine if the priority exceeds an event notice level for the first context,
- instructions to determine if the priority exceeds an event notice level for a second context for a second one of the plurality of end user devices; and
- instructions to, upon determining that the priority exceeds the event notice level for the first end user device, send from the internet protocol television server to the first end user client the dynamic event notification data; and
- instructions to, upon determining that the priority does not exceed the event notification level for the first end user device and determining that the priority exceeds an event level of interest for the second end user device, send from the internet protocol television system to the second user client device, the event notification data.

10. The system of claim 9, wherein the internet protocol television end user device is of a cell phone.

11. The system of claim 9, wherein the dynamic event notification data comprises an internet protocol message.

12. The system of claim 9, wherein the instructions to send further comprise:
- instructions to determine a priority for the dynamic event notification data,
- instructions to compare the priority to an event notice level for the current internet protocol television viewer and
- instructions to delay the sending of the dynamic event notification data at the internet protocol television server until the priority exceeds the event notice level for the current internet protocol television viewer.

13. The system of claim 12, wherein the priority is determined from a dynamic event type indicated by the dynamic event notification data and the event notice level is determined by a current internet protocol television viewer context.

14. The system of claim 13, wherein the dynamic event type is based on a level of interest for the event type and the current internet protocol television viewer context is based on a level of interest for the current internet protocol television viewer context.

15. The system of claim 14, wherein the context further comprises data selected from the group consisting of current internet protocol television viewer data, current program being viewed data, time of day data and location of the event data.

16. A non-transitory computer readable medium containing a computer program that when executed by a computer perform functions useful for distributing dynamic event notification data in an internet protocol television system, the computer program comprising:
- instructions to identify a plurality of end user devices associated with a current viewer in the internet protocol television system;
- instructions to determine a priority for an event associated with the current viewer;
- instructions to determine a first context for the current viewer, based on a first plurality of different parameters comprising the current viewer watching a particular program on a first one of the plurality of end user devices;
- instructions to determine if the priority exceeds an event notice level for the first context;
- instructions to determine if the priority exceeds an event notice level for a second context for a second one of the plurality of end user devices; and
- instructions to, upon determining that the priority exceeds the event notice level for the first end user device, send from the internet protocol television server to the first end user client the dynamic event notification data; and
- instructions to, upon determining that the priority does not exceed the event notification level for the first end user device and determining that the priority exceeds an event level of interest for the second end user device, send from the internet protocol television system to the second user client device, the event notification data.

17. The computer readable medium of claim 16, wherein the instructions to send further comprise:
- instructions to determine a priority for the dynamic event notification data;
- instructions to compare the priority to a event notice level for the current internet protocol television viewer; and
- instructions to delay the sending of the dynamic event notification data at the internet protocol television server until the priority exceeds the event notice level for the current internet protocol television viewer.

* * * * *